(12) United States Patent
Graham (10) Patent No.: US 11,820,501 B2
(45) Date of Patent: Nov. 21, 2023

(54) BOX RIB

(71) Applicant: GKN Aerospace Services Limited, Redditch (GB)

(72) Inventor: Daniel Graham, Redditch (GB)

(73) Assignee: GKN Aerospace Services Limited, Redditch (GB)

( * ) Notice: Subject to any disclaimer, the term of this patent is extended or adjusted under 35 U.S.C. 154(b) by 284 days.

(21) Appl. No.: 16/648,678

(22) PCT Filed: Sep. 27, 2018

(86) PCT No.: PCT/GB2018/052751
§ 371 (c)(1),
(2) Date: Mar. 19, 2020

(87) PCT Pub. No.: WO2019/064004
PCT Pub. Date: Apr. 4, 2019

(65) Prior Publication Data
US 2020/0216162 A1    Jul. 9, 2020

(30) Foreign Application Priority Data

Sep. 27, 2017    (GB) ...................................... 1715650

(51) Int. Cl.
*B64C 3/26*    (2006.01)
*B64C 3/18*    (2006.01)
(Continued)

(52) U.S. Cl.
CPC ............... *B64C 3/26* (2013.01); *B64C 3/185* (2013.01); *B29L 2031/3085* (2013.01); *B32B 2262/106* (2013.01); *B32B 2605/18* (2013.01); *B33Y 80/00* (2014.12); *B64C 3/187* (2013.01); *B64C 3/20* (2013.01); *B64C 2001/0072* (2013.01); *B64F 5/10* (2017.01)

(58) Field of Classification Search
CPC   B64C 3/26; B64C 3/185; B64C 3/187; B64C 3/20; B64C 2001/0072; B64C 3/18; B29L 2031/3085; B32B 2262/106; B32B 2605/18; B33Y 80/00; B64F 5/10
See application file for complete search history.

(56) References Cited

U.S. PATENT DOCUMENTS

2005/0236524 A1    10/2005  Sarh
2009/0206203 A1*   8/2009   Crawford .................. B64F 5/10
                                                    244/123.7
(Continued)

FOREIGN PATENT DOCUMENTS

EP    2583895 A2    4/2013
EP    2886450 A1    6/2015
(Continued)

OTHER PUBLICATIONS

UKIPO Office Action dated Aug. 17, 2021 for Application No. GB1715650.6 (5 pages).
(Continued)

*Primary Examiner* — Brian Handville
(74) *Attorney, Agent, or Firm* — Bejin Bieneman PLC (57) ABSTRACT

A rib can be manufactured comprising two opposing outer skins and a plurality of internal reinforcement members connecting the skins together.

20 Claims, 4 Drawing Sheets

(51) Int. Cl.
  *B33Y 80/00* (2015.01)
  *B64F 5/10* (2017.01)
  *B29L 31/30* (2006.01)
  *B64C 3/20* (2006.01)
  *B64C 1/00* (2006.01)

(56) References Cited

U.S. PATENT DOCUMENTS

| | | |
|---|---|---|
| 2010/0181427 A1 | 7/2010 | Makela |
| 2014/0209744 A1 | 7/2014 | Brown et al. |
| 2015/0197328 A1* | 7/2015 | Pereira Mosqueira ... B64C 9/02 244/87 |
| 2016/0207607 A1* | 7/2016 | Charles ................... B64C 1/12 |
| 2017/0259905 A1 | 9/2017 | Kooiman et al. |
| 2017/0291682 A1 | 10/2017 | Sullivan |

FOREIGN PATENT DOCUMENTS

| | | |
|---|---|---|
| EP | 3031712 A1 | 6/2016 |
| GB | 2542435 A | 3/2017 |
| WO | 2008/012569 A2 | 1/2008 |

OTHER PUBLICATIONS

International Search Report and Written Opinion for PCT/GB2018/052751 dated Nov. 21, 2018 (12 pages).
UKIPO Search Report for GB 1715650.6 dated Mar. 19, 2019 (5 pages).

\* cited by examiner

BOX RIB

CROSS-REFERENCE TO RELATED APPLICATIONS

This application is a national stage of, and claims priority to, Patent Cooperation Treaty Application No. PCT/GB2018/052751, filed on Sep. 27, 2018, which application claims priority to Great Britain Application No. GB 1715650.6, filed on Sep. 27, 2017, which applications are hereby incorporated herein by reference in their entireties.

BACKGROUND

In the aerospace sector ribs can be used in wings, horizontal or vertical tail-planes (empennage), in tail-booms of helicopters, and smaller ribs in things like winglets and flaps.

An aircraft wing comprises an outer aerodynamic surface over which air is caused to flow by forward motion of the aircraft. Wings generally comprise one or more spars extending within the wing from the root, where the spar connects to the fuselage, to the wing tip.

Ribs, again within the wing, are attached at predetermined intervals along the length of the spar. The ribs generally extend in a forward direction of flight, i.e., are generally perpendicular to the spar extending in a fore and aft direction of the aircraft movement.

The shape and contour of the spar and ribs corresponds to the desired shape of the aerofoil. The outer aerodynamic surface can then be connected to the ribs and spar (by various means) to form the wing.

Ribs are conventionally machined from a billet of aluminium or other lightweight material using CNC tools so that the precise geometry of the spars can be obtained. Conventional wings made using these techniques allow a lightweight wing to be manufactured accurately for each aircraft design providing the desired strength and stiffness.

SUMMARY

The present disclosure provides optimization of a wing design and in particular wing rib manufacture, i.e., the structural component in aircraft wings known in the art as ribs. Further, although particularly suited to aircraft ribs the present disclosure may be employed in other related applications. For example, the technology may be used in a variety of applications using "rib-like" reinforcing structures including architectural/civil markets.

Aspects of the invention are set out in the accompanying claims.

Viewed from a first aspect there is provided a rib for an aircraft wing, said rib comprising a pair of opposing outer skins, the outer skins defining an internal space therebetween, said rib further comprising a plurality of internal reinforcement members extending across the space and connecting the pair of opposing outer skins.

This arrangement is substantially different to conventional rib structures and is counterintuitive in the sense that convention has dictated that a single central plate is used to form the rib onto which peripheral rib 'feet' can be connected. A single plate minimised the weight of each rib and allowed a rib to be formed without unduly increasing the overall weight of the wing. Creating ribs that each have a pair of plates, in a box type structure, was not previously considered for at least these reasons.

The outer surfaces of the box structure may advantageously be formed of relatively thin skin material such as aluminium sheets or thin plates. The box structure provides a strong and rigid body.

The reinforcement members within the box structure extend between the opposing outer skins to couple the skins together and to form the rigid box structure.

The internal reinforcement members may be made in a number of ways, such as being machined from a billet in a conventional manner. However, advantageously the internal reinforcement members may be in the form of extrusions. An extrusion allows for economical manufacture of the reinforcements with minimal material wastage and limited machining steps (other than possibly machining the surfaces facing the skins). The combination of the skins (forming the outer surfaces) and the extruded internal reinforcement members provide for a highly economical way to form the ribs, which avoids machining substantial billets and intricate rib 'feet' connections.

Viewed across the reinforcement member (i.e., between the two skin surfaces) the reinforcements may have a uniform cross-section, i.e., the cross-section may be the across the width of the space defined between the skins. In order to minimise the weight of the reinforcement members each member may have a stepped or tapered profile such that a portion of the reinforcement member between the opposing skins has a smaller cross-section than portions adjacent to the opposing skins. In effect the reinforcement members are narrower at a midway position between the skins. This allows for a larger area at the skins for coupling the reinforcement member to the skins and a narrowing cross-section extending between the skins. This minimises weight. The central portion of the reinforcement member may be in the form of an I-beam with two opposing connecting portions.

The opposing outer skins may be substantially parallel with each other and substantially flat. Alternatively, the skins may be tapered with respect to each other, for example with a narrower separation at a leading or trailing edge of the rib. The skins may alternatively have a serpentine shape or zig-zag shape. The shape of the skins for the ribs may be selected depending on the anticipated loading and forces on the wing in use. Thus, the strength of the box structure can be optimised for the given flight application.

The skins may be provided with an upper profile (i.e., shape) that corresponds to the outer profile of the wing i.e. the aerofoil shape of the wing. The reinforcement members may each have a length (extending between the upper and lower wing skin connections) which corresponds to the desired height of the wing at the given position of the reinforcement member.

The reinforcement members may be equally spaced along the length of the rib or they may be un-evenly spaced according to the determined loading of the wing in flight. Again, the box rib can be optimised easily to match the required operating loading of the wing.

The reinforcement members may be arranged to extend continuously between the upper and lower surfaces of the wing. A continuous reinforcement may then be coupled to each of the opposing wing skins. Alternatively, one or more reinforcement members may extend partially along the height between the upper and lower wing surfaces. A combination of full height reinforcements and partial height reinforcements may be used, again depending on the loading requirements of the wing.

The reinforcement members may also all be substantially parallel, for example at 90 degrees to a horizontal line running from the leading edge to the trailing edge of the wing. Alternatively, to provide still further options to optimise the rib and wing one or more of the reinforcement members may be arranged at angles to one another. A variety of internal structures may be formed within the space defined between the skins using the reinforcement members. For example, reinforcement members may be arranged at 45 degrees to the vertical at predetermined positions along the rib and may intersect with other reinforcement members at different positions.

As described above, each reinforcement member extends between the opposing skins and additionally all or part way along the height of the rib (the height being defined between the upper and lower surfaces of the wing skins that are attached to the rib upper and lower profiles).

Adjacent reinforcement members (in a fore-aft direction of the rib) may conveniently define spaces between adjacent members into which stringers may be located. For example, the skins forming the outer skins of the rib may be provided with cut-out sections on the upper and lower surfaces corresponding to the desired position at which a stringer must run along the length of the wing. Because the skins are formed of generally thinner wall material these cut-outs may be conveniently stamped or cut from the upper and lower surfaces of the skins. Again, manufacturing complexity and cost is minimised according to the rib structure described herein.

Conventionally a skin is connected to a rib by means of rivets extending through the wing skins surface that are then connected on a rear (inside) surface of the wing skin to secure the skin to the rib. The present structure negates the need for such a time consuming, costly and complex operation. Furthermore, the present structure allows the skin to be conveniently de-coupled from the rib allowing for fast and convenient maintenance of the wing during operational use/routine maintenance.

Specifically, an upward or downward facing surface of one or more reinforcement members (against which the skin surface is abutted) may be provided with one or more holes arranged to receive a fastening. For example, the distal ends of the reinforcement members may be provided with tapped blind (or non-blind) holes which may allow a screw or threaded bolt to be screwed into the hole to secure the skin to the end of the reinforcement members. The reinforcement members effectively serve not only to provide stiffness between the opposing skins but also provide distal end surfaces into which screws or the like can be applied to secure the wing skins to the upper and lower surface. As described above this allows the wing skin to be coupled to the ribs from an outer side, without the need to enter or access the space inside the wing cavity. This provides more space for other equipment or fuel tanks within the wing.

The box structure of a rib as described herein also conveniently allows the rib to be coupled to the spars of the wing, i.e., the members extending from the fuselage towards the tip of the wing. Specifically, a leading edge or trailing edge end of the rib may be arranged to be coupled to a spar of the wing. This may for example be by coupling the ends of the rib in a fore-aft direction to a corresponding spar.

The connection between spar and rib may be made in a number of ways. In one arrangement the leading or trailing edges of the rib may be provided with a plurality of holes to receive a fastener to attach the spar to the rib. These may be similar to the couplings described above and may be in the form of threaded or tapped holes into which screws or bolts may be fastened to connect the spars and the leading and trailing edges of the rib to the rib. These may for example be coupled to one of the reinforcement members which may be provided with suitable threaded holes to receive a fastener.

The reinforcement members may be secured to the opposing skins using conventional techniques such as rivets or the like. However, advantageously, the reinforcement members may be connected to the skins by means of one of friction stir welding, linear friction welding or rotary friction welding. These techniques provide extremely strong connections and allow for an efficient manufacturing process since the welding can be performed from the outer surface of the skins. Furthermore, these techniques provide an uninterrupted surface i.e. the surface is not interrupted with rivets or bolts. Still further, a friction stir process can enhance the surface properties of the skin in that the crystalline structure is disrupted thus enhancing the hardness of the outer surface of the skins. This is particularly advantageous around the leading edges of the wing skin.

The skins and reinforcement members may be formed of the same material, thus allowing a friction stir (or similar) welding process to be conveniently used.

Alternatively, a composite structure may be used in which multiple materials are used. For example, the opposing skins may be formed of a first material and one or more reinforcement members may be formed of a second material. The reinforcement members may conveniently allow the skins that are coupled to the ends of the members to be a different material to the reinforcement members themselves. For example, the reinforcement members may be a carbon fibre reinforced plastic (a thermoset or thermoplastic). Alternatively, the reinforcements may be metallic extrusions (or additive manufactured components) and the skins a carbon reinforced plastic. Any other suitable combination may be used by virtue of the flexibility the box structure provides.

Viewed from another aspect there is provided a method of manufacturing a rib for an aircraft wing, wherein the rib comprises a pair of opposing outer skins, the outer skins defining an internal space there-between, said rib further comprising a plurality of internal reinforcement members extending across the space and connecting the pair of opposing outer skins, said method comprising the steps of:
(A) welding a first skin to a first side of the reinforcement members; and
(B) welding the opposing side of each reinforcement member to the second skin.

Such a manufacturing method allows ribs to be formed in a highly efficient and flexible manner—flexible in the sense that there is a great deal of design freedom in the way the structure can be optimised for the given application.

The welding operation may be any suitable welding operation. However, for at least the reasons described above welding may be selected from one of friction stir welding, linear friction welding or rotary friction welding. These can be applied from the outer surface of the skins further improving the efficiency of manufacturing the ribs.

A still further aspect of the extends to an aircraft wing comprising one or more ribs as described herein.

Viewed from yet another aspect, there is provided a method of manufacturing a rib for an aircraft wing, said method comprising the steps of:
(A) extruding a plurality of rib sub-sections, each rib sub-section comprising two opposing outer surface portions and a reinforcement portion extending between the two opposing outer surface portions; and
(B) connecting a plurality of rib sub-sections together to form a rib.

Extruding the reinforcement members substantially improves manufacturing costs since large volumes of extrusions can be formed at lower costs. In such an arrangement the reinforcement member may also include distal end portions that, when brought together, form the outer skin surface. In effect the reinforcement members each comprise a portion of the outer skin surfaces such that when a plurality of such sub-sections are brought together adjacent to one another they not only provide the reinforcement members but also form the continuous outer skin surfaces.

The outer surface portions may be provided with a matching connector portions arranged in use to abut with a corresponding matching portion of an adjacent rib sub-section. The matching portion may for example be a stepped complementary shape such that two sub-sections match when brought together to form a continuous surface. This may be example be by means of a suitable stepped shape where adjacent sub-sections locate into adjacent steps or recesses. Depending on the material selection, adjacent sub-sections may be joined together in any suitable way, for example by glue, welding or curing as examples.

Viewed from yet another aspect there is provided a modular rib for an aircraft wing, said modular rib comprising a plurality of sub-components, each sub-component being formed of two opposing outer surfaces and a reinforcement member extending between the two opposing outer surfaces, wherein adjacent sub-components are connectable together to form a rib.

Such a modular configuration allows each module to be manufactured efficiently and brought together to form the rib.

Viewed from a still further aspect there is provided an additive manufacturing method for manufacturing a rib for an aircraft wing, wherein the rib comprises a pair of opposing outer skins, the outer skins defining an internal space there-between, said rib further comprising a plurality of internal reinforcement members extending across the space and connecting the pair of opposing outer skins wherein the opposing skins and reinforcement members are built by means of an additive manufacturing process.

An additive manufacturing approach allows the internal space between the opposing skins to be formed in a more complex and intricate way. More specifically the internal structure can be optimised for the expected loading of the ribs in flight. It can also be optimised for weight and weight distribution. More specifically, additive manufacture allows the internal reinforcement members to be non-uniform (since they need not be extruded) and thus they can be varying shapes, geometries, angles, thicknesses and so forth. The reinforcement members need not be continuous from the upper to lower extents of the rib but may be in the form of a series of discrete and un-connected reinforcement members arranged at optimised positions within the structure. Similarly the reinforcement members may be contoured, i.e., curved, for example, to further optimise the design.

In one embodiment the internal structure of the rib may be in the form of a lattice structure having a varying lattice density across the rib. The density can be increased and decreased according to the predetermined loading of the rib during flight. Additive manufacturing further allows each rib along the length of the wing to be optimised in design with (for example) each rib being different in terms of internal structure.

Thus, the cross-section and/or shape of each internal reinforcement member may be formed by the additive manufacturing process in response to a predetermined step of modelling the expected loading of the reinforcement member during use.

Viewed from yet another aspect there is provided a method of operating an additive manufacturing machine, comprising the steps of programming the machine with a build model for a rib for an aircraft wing, wherein the rib comprises a pair of opposing outer skins, the outer skins defining an internal space there-between, said rib further comprising a plurality of internal reinforcement members extending across the space and connecting the pair of opposing outer skins; and wherein the structure of the internal reinforcement members is determined according to the expected in-use loading of the internal reinforcement member, wherein the additive manufacturing machine is configured in use to form the opposing skins and reinforcement members.

This may for example be by means of a layer-by-layer approach.

Thus, an additive manufacturing machine, such as a powder bed deposition (or similar) additive manufacturing machine, may be configured to create the box structure rib described herein. As described above, programming the machine based on a determination of the expected loading of the internal structure (for example from modelling such as FEA or the like) allows the structure to be optimised. For example, the density thickness of the internal reinforcement members may be increased at positions where high loads are predicted.

Similarly, the density/thickness can be reduced at positions where lower loads or forces are predicted. This advantageously allows the rib to accommodate the desired operating loads whilst minimising weight and material consumption. It may also further reduce manufacturing time.

BRIEF DESCRIPTION OF THE DRAWINGS

One or more embodiments will now be described, by way of example only, and with reference to the following figures in which:

FIGS. 4(a) to 4(c) show existing approaches to rib foot design and FIG. 4 (d) shows a rib described herein;

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the following examples. It will be appreciated that the invention as claimed is not intended to be limited in any way by these examples. It will also be recognised that the invention covers not only individual embodiments but also combination of the embodiments described herein.

DETAILED DESCRIPTION

Figure 1:
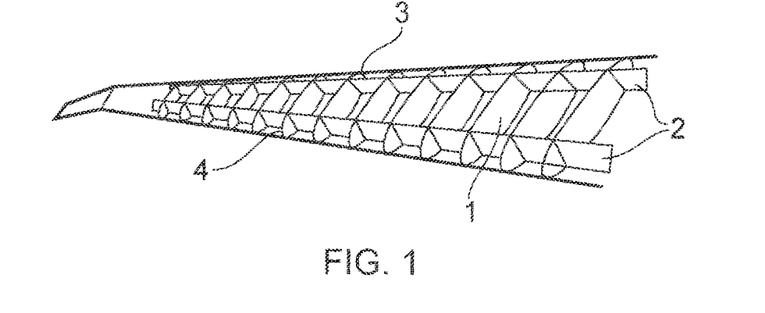
FIG. 1 illustrates the internal structure of a wing.

FIG. 1 shows the internal structure of a wing. Ribs 1 and spars 2 make up the main load bearing structure of the wing. Spars run span-wise relative to the aircraft, i.e., down the length of the wing, and ribs run fore-aft between the leading edge 3 and the trailing edge 4.

Figure 2:
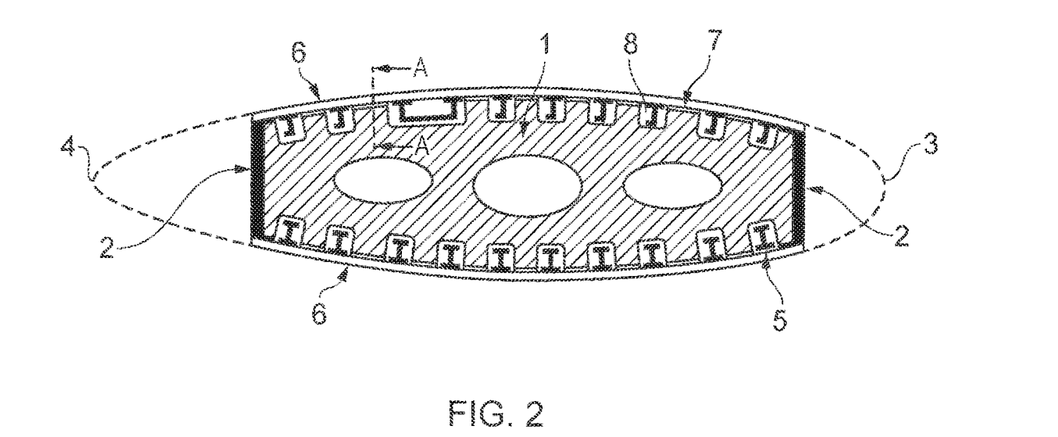
FIG. 2 shows a cross-section of a rib from FIG. 1.

FIG. 2 shows a section through the wing in the plane of a rib 1. As shown, the structure of the wing is made up of ribs 1, spars 2, stringers 5 and outer skin 6. The stringers extend span-wise along the length of the wing to support the skin in a span-wise direction. The stringers 5 pass through apertures 8 machined into the rib 1.

Leading and trailing edge geometries are shown in dotted lines in FIG. 2 and extend from the spars 2 on either side. FIG. 2 shows how the rib 1 creates a supporting profile for the wing covers to be fastened to. The wing covers comprise the skin 6 with pre-attached stringers 5 (also known as stiffeners), which vary in section. The stringers extend along the length of the wing from the fuselage to the wing tip.

The skin 6 is attached to rib feet 7 at a plurality of positions around the periphery of the rib.

Figure 3:
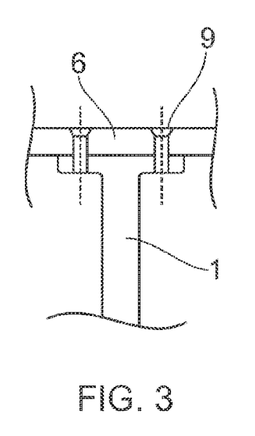
FIG. 3 shows a rib foot in cross-section through A-A' shown in FIG. 2.

FIG. 3 shows a section through A-A' shown in FIG. 2 and specifically the interface of a conventional rib foot 7 and wing cover (i.e. the stringers and skin). As shown the rib 1 has a 'T shaped' upper section which can be conveniently connected to the wing surface 6 by means of rivets 9 or the like. Thus, the wing outer surface can be secured to the rib.

Figure 4:
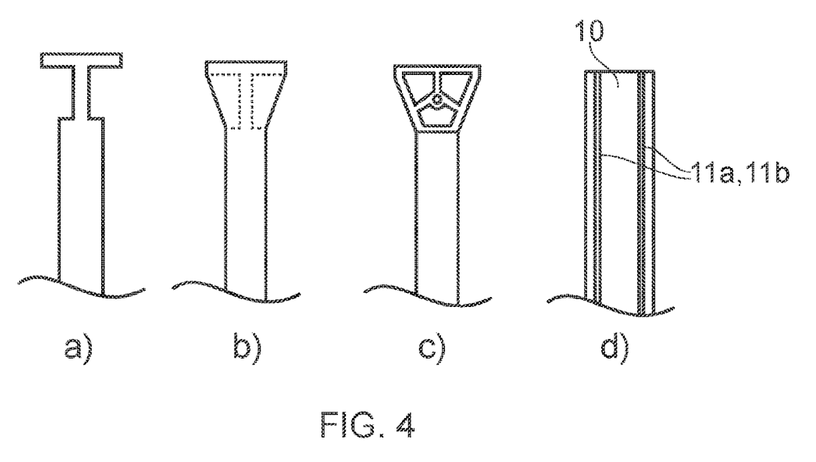

FIG. 4 illustrates different configurations of rib feet.

FIG. 4(a) shows a conventional T-section rib foot which provides a simple means to connect the rib to the skin.

FIG. 4 (b) shows a T-Section rib with stiffening webs (shown in dotted lines) that offer more efficient performance in terms of rigidity. However, the improvement in rigidity comes at a price since these ribs can be more expensive to manufacture in terms of additional material requirements and machining time.

FIG. 4 (c) shows an extruded or additive manufactured rib foot with internal reinforcements within a triangular body. This advantageously offers improved performance without excessive material requirements although the manufacturing process is more complex than the basic rib foot shown in FIG. 4(a).

FIG. 4(d) shows an unconventional and alternative rib approach which dispenses with the conventional rib foot connection. Specifically, an entirely different concept is used for the rib construction using a pair of load bearing face skins, reinforced with members located between the load bearing skins. In effect a 'sandwich' type structure is used.

Conventional ribs, such as that shown in FIG. 4(a), are based on the concept of a single plate that is reinforced with stiffening webs and has plurality of 'feet' for attachment to the wing skins. These structures can then be optimised to meet the specific load bearing requirements of the wing.

Figure 11:
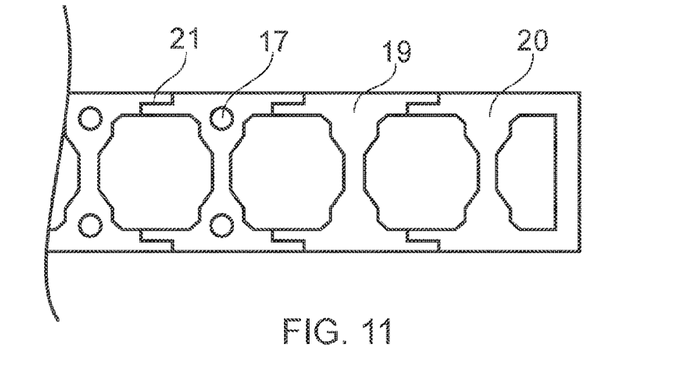
FIG. 11 shows an extruded and modular rib construction.

The present disclosure uses a completely different structure which will now be described with reference to FIGS. 4 (d) to 11.

FIG. 4 (d) shows the configuration of rib comprising a central reinforcement 10 and two opposing load bearing skins 11a, 11b.

Figure 5:
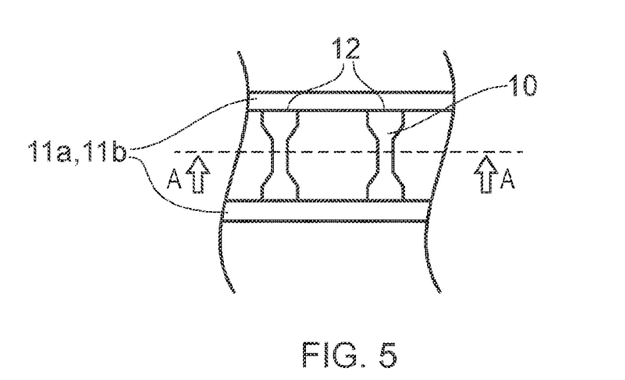
FIG. 5 shows a top down view of the present rib arrangement.

FIG. 5 shows one example rib structure described herein in a top down view of the arrangement shown in FIG. 4(d). FIG. 5 shows the reinforcement 10 and the two opposing load bearing skins 11a, 11b.

The reinforcements 10 are coupled to each load bearing skin 11a, 11b at interfaces 12. The reinforcements and skins may be coupled together using conventional techniques. However, advantageously the reinforcements may be connected by a friction stir welding process to create a single component rib incorporating the two skins and intermediate reinforcements.

Figure 6:
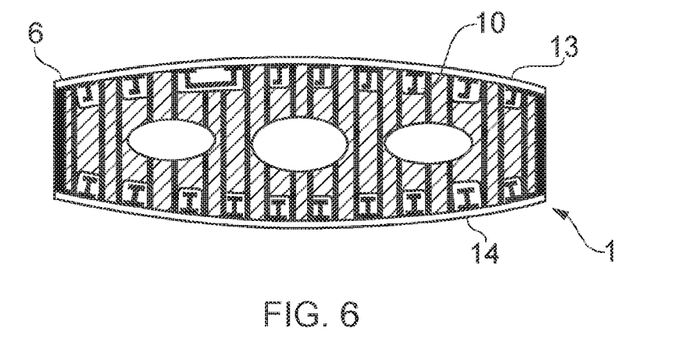
FIG. 6 shows a cross-section through A-A' in FIG. 5.

FIG. 6 shows a cross-section through A-A' from FIG. 5. As shown the reinforcements 10 extend from the upper surface 13 of the rib 1 to the lower surface 14. The outer wing skin surface 6 can then be coupled to the upper and lower surfaces 13, 14.

FIGS. 5 and 6 illustrate the unconventional 'box' structure of the rib described herein. The 'box' is formed by the outer surfaces 11a, 11b. The intermediate reinforcements 10 extending between the surfaces provide the structure with rigidity. Advantageously the alternative design allows for increased flexibility in rib design and allows for optimisation of strength and minimisation of material usage. It also conveniently allows the rib to be manufactured easily using techniques such as friction stir welding.

Figure 7:
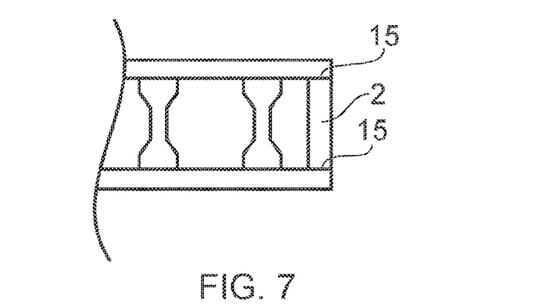
FIG. 7 shows a spar and rib connection.

FIG. 7 illustrates how the rib can be coupled to the spars (shown in FIG. 1). The rib may be conveniently coupled directly to the spar 2 at coupling points 15. These couplings may also be in the form of friction stir welds.

Figure 8:
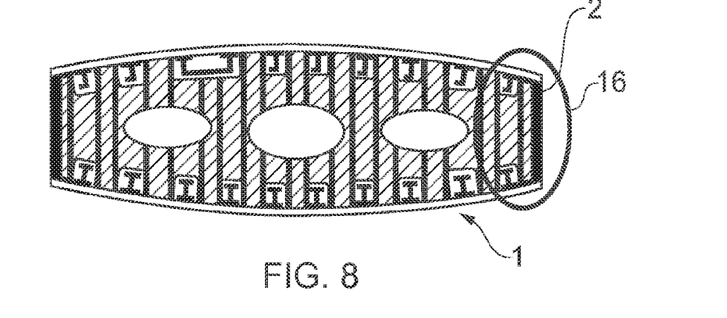
FIG. 8 shows a cross-section through FIG. 7, corresponding to FIG. 5.

FIG. 8 is a corresponding cross-section to that shown in FIG. 5 but illustrating the connection 16 between the rib 1 and spar 2.

As described above the connection 15 between the rib and spar may be made in a number of suitable ways. Similarly, the outer side surfaces 11a, 11b can also be coupled to the reinforcements 10 using conventional couplings (such as rivets) or my means of friction stir welding or the like.

Figure 9:
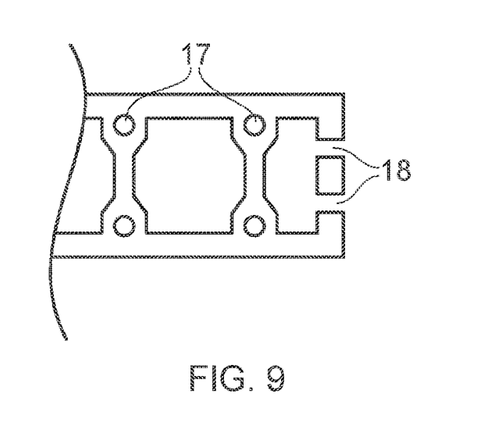
FIG. 9 shows a top down view of rib/skin coupling points.

Referring to FIG. 9, holes 17 may be tapped into the reinforcement outer side surface or a point at which the two meet (as shown in FIG. 9). The tapped holes 17 (i.e., holes with threads cut into them to receive a fastening such as a bolt or screw) allows the outer wing surface 6 to be coupled to the rib without the need for nuts or the like on the inside of the wing. This may dramatically reduce the assembly time for the wing since access inside the wing body to attach nuts or the like is no longer required.

Similarly, the spar and rib may also be connected in a similar way using holes 18 on the outer edge of the rib assembly. These holes 18 may be conventional holes to receive a nut and bolt or may also be tapped to receive a threaded fastener.

Figure 10:
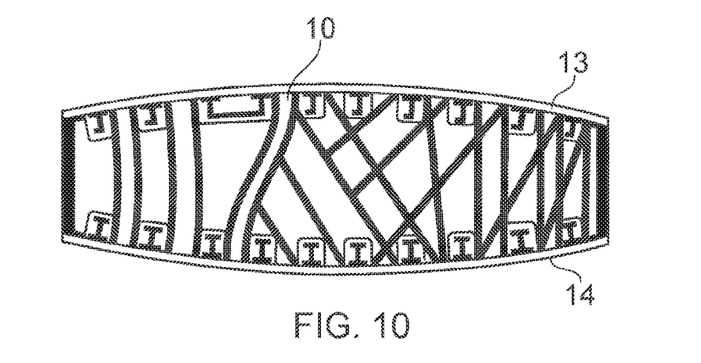
FIG. 10 is a cross-section through a rib having non-uniform and optimised reinforcements.

FIG. 10 shows another cross-section through a rib described herein. As shown the reinforcements 10 are not linear between the upper and lower surfaces but instead have been optimised for strength and rigidity. As shown some reinforcements are straight whilst some are arranged at angles, are serpentine and even vary in width, i.e., they may be selectively tapered or change in width/thickness depending on loading requirements.

The rib as described herein provides an extremely versatile design which can be fully optimised to accommodate the expected loads. For example, the distribution and size of the reinforcements may be matched closely to stress models of the wing to optimise the wing's strength whilst minimising the material used. This advantageously not only simplifies the manufacturing of the rib but it also minimises the material and thus the weight. Since each wing will contain a plurality of ribs, even a modest material saving can make significant difference to the overall weight of the wing. The reinforcing structure could be optimised with a wide range of example geometries.

For metallic reinforcements, it may be possible to bend extrusions, pre-join metal reinforcement details, cast optimised internal structure for joining, additively manufacture internal structure, add access/system hole reinforcing rings and so forth. The arrangement provides a range of manufacturing processes to be used.

The couplings described here may, as described above, be conventional couplings or welds. Welding may include conventional welding or friction stir welding. Further alternatives may include linear friction welding or rotary friction welding of blocks could also be used to create cover interface 'land' on one face sheet before adding the next. A friction stir weld (or similar operation) could conveniently be used on the skin 11a, 11b surface to weld the reinforcements to the skins from the outside of the box structure. This further facilitates efficient manufacture.

Still further, the rib may be formed of a composite material, such as a carbon fibre reinforced plastic (thermoset or thermoplastic). For thermoset composite processing, it would be possible to pre-fabricate the internal structure and co-cure or secondary bond it. Alternatively, the whole composite structure could be delivered in a one-shot cure process. Where cost and production rate are significant considerations, infusion and out of autoclave curing could also be used. To allow a composite component to be suitably connected to an adjacent part of the wing, inserts could be integrated at the interface points to receive a coupling such as a nut and bolt or rivet.

For thermoplastic composite processing (for example a material comprising a carbon fibre and plastic/resin mix), a central reinforcing structure could be molded and then thermoplastic welded to the face sheets, for example.

A further alternative may be to use 'hybrid box ribs' comprising composite and metallic materials where appropriate to do so. For example, a rib comprising composite skins with an optimised titanium reinforcing structure may be used. This could be low cost extrusion or a high performance additively manufactured or cast structure. This could be secondary bonded, co-cured, or in the case of thermoplastic a hybrid joining method that combining chemical bonding with mechanical interlocking which may be achieved by the re-melting potential of the material.

It will be recognised that any suitable combination of material may be used according to a rib arrangement and manufacturing method described herein. For example, aluminium and aluminium alloys may be used which can be conveniently welded and are also light. Similarly, more exotic materials may be used either alone or in combination such as titanium and titanium alloys. A broad range of combinations of materials can be used for the sub-components of the rib. This could be a combination of metallic, composite and plastic (thermoplastic and thermoset) materials. In effect a multi-material rib may be realised in an unconventional configuration and unconventional manufacturing method.

FIG. 11 shows a further arrangement of a box rib described herein.

The outer surfaces 11a, 11b and reinforcement could be fabricated using extrusions. Here two adjacent extrusions 19, 20 may be first extruded to a predetermined shape (cross-section) and then welded or otherwise bonded together. For example, the two adjacent extrusions could be friction stir welded together to create a net shape. Advantageously, the rib may then be formed without using separate skins 11a, 11b described above. This negates the need for separate skins and moves the rib to skin interface holes 17 away from the friction stir welded joint 21. This may then provide an advantage in terms of mechanical performance.

An alternative rib construction approach as described herein provides a range of technical advantages including, but not limited to:

1. Improved buy to fly ratios on metallic ribs.
2. Low cost net shape manufacture for metallic ribs. For example, aluminium friction stir welding is fast, high performance, tailorable and in this case it would be very simple since the joining is all in one plane (flat).
3. Disruptively low finishing costs compared to current ribs, for example, if friction stir welding is used to join extrusions, finishing would be significantly reduced to some edge profiling and cut-outs. All of the historic roughing and deep pocket machining would be gone, removing huge costs from the process. Furthermore, non-recurring costs associated with needing multiple fixtures for different machining stages on different ribs would be gone, since every single rib is flat on each side and as such can be vacuumed (for example) onto a flat bed.
4. Enhanced design freedom, new optimisation opportunities, especially for composite ribs where historic attempts at 'black metal' designs have not been successful. This approach could enable new architectures.
5. Enabler for low cost wing-box assembly, the new style of rib could contain threaded holes for assembly, to avoid use of nuts and sealing of nuts in wing box assembly. Furthermore, the new style of rib could afford new design freedoms for alternative cover-rib and spar-rib interface designs that give improved performance or reduced assembly hours.
6. Applicable to a range of materials, aluminium alloys, titanium alloys, magnesium alloys, thermosets, thermoplastics
7. Qualification of a metallic option based on friction stir welding.

As described above the box rib structure may be conveniently formed by welding (for example friction stir welding) a pair of skins 11a, 11b to a plurality of reinforcements 10. The welds may for example be continuous along the length of the reinforcements or may be intermittent as required according to the loading on the reinforcement and rib.

The box rib structure may also be formed using an additive manufacture process. Additive manufacture allows 3 dimensional shapes to be formed by adding material, usually layer by layer, to generate the desired structure. Additive manufacturing techniques allow intricate and complex shapes, including internal geometries, to be created in metallic form using powder metals (in one example process).

In each of the embodiments described herein an additive manufacturing process many conveniently be used. For example, a powder bed fusion process may be used to build the opposing skins and reinforcement portions in a layer-by-layer approach. Advantageously such a process allows the internal geometries (e.g. thicknesses, densities, distributions and shapes/contours) to be fully optimised. This may for example be in response to a determination of desired strength through finite element analysis or other modelling. Thus, the rib can be fully optimised and complex internal shapes such as those illustrated in FIG. 10 may be realised.

The invention claimed is:

1. A rib for an aircraft wing, said rib comprising:
  a pair of opposing outer rib skins, each outer rib skin extending from an upper edge connectable to an upper outer wing skin of the aircraft wing to a lower edge connectable to a lower outer wing skin of the aircraft wing, one of the outer rib skins spaced apart in a span-wise axis of the wing from the other of the outer rib skins in use so as to define an internal space there-between that separates the outer rib skins in the span-wise axis such that the outer rib skins are non-overlapping along the span-wise axis; and a plurality of internal reinforcement members extending across the space and connecting the pair of opposing outer rib skins;

wherein at least one of the reinforcement members has a stepped or tapered cross-section such that a portion of the reinforcement member between the opposing outer rib skins has a smaller cross-section than portions adjacent to the opposing outer rib skins.

2. The rib of claim 1, wherein the internal reinforcement members are extrusions.

3. The rib of claim 1, wherein the opposing outer rib skins are substantially parallel.

4. The rib of claim 1, wherein upper and lower surfaces of the outer rib skins are configured to follow a predetermined contour corresponding to a wing aerofoil shape.

5. The rib of claim 4, wherein each of the reinforcement members extends along the lengths of the outer rib skins from the upper to the lower surfaces.

6. The rib of claim 1, wherein the reinforcement members are all substantially parallel.

7. The rib of claim 1, wherein at least two of the reinforcement members are arranged at varying angles with respect to each other.

8. The rib of claim 4, wherein at least one of the reinforcement members extends part-way along the length of at least one of the outer rib skins measured from an upper or lower surface.

9. The rib of claim 1, wherein spaces between adjacent reinforcement members are arranged to receive stringers to extend span wise along the length of the wing.

10. The rib of claim 1, wherein a portion of a reinforcement member adjacent to an upper or lower surface of the rib and proximate to an inner surface of one of the outer rib skins includes a hole arranged to receive a fastening.

11. The rib of claim 10, wherein the hole is a tapped hole arranged to receive a threaded fastening.

12. The rib of claim 1, wherein a leading edge or trailing edge end of the rib is arranged to be coupled to a spar of the wing.

13. The rib of claim 12, wherein leading or trailing edges of the rib are provided with a plurality of holes to receive a fastener to attach the spar to the rib.

14. The rib of claim 1, wherein the reinforcement members are connected to the outer rib skins by one of friction stir welding, linear friction welding, or rotary friction welding.

15. The rib of claim 1, wherein the reinforcement members and outer rib skins are formed of a same material.

16. The rib of claim 1, wherein the opposing outer rib skins are formed of a first material and wherein one or more of the reinforcement members are formed of a second material.

17. The rib of claim 1, wherein the outer rib skins in use extend from the upper outer wing skin of the aircraft wing to the lower outer wing skin of the aircraft wing.

18. A method of manufacturing a rib for an aircraft wing, wherein the rib comprises a pair of opposing outer rib skins, each outer skin extending from an upper edge connectable to an upper outer wing skin of the aircraft wing to a lower edge connectable to a lower outer wing skin of the aircraft wing, one of the outer rib skins spaced apart in a span-wise axis of the wing from the other of the outer rib skins in use so as to define an internal space there-between that separates the outer rib skins in the span-wise axis such that the outer rib skins are nonoverlapping along the span-wise axis, said rib further comprising a plurality of internal reinforcement members extending across the space and connecting the pair of opposing outer rib skins:

said method comprising the steps of:
(A) welding a first skin to a first side of the reinforcement members; and
(B) welding the opposing side of each reinforcement member to the second skin;
wherein at least one of the reinforcement members has a stepped or tapered cross-section such that a portion of the reinforcement member between the opposing outer rib skins has a smaller cross-section than portions adjacent to the opposing outer rib skins.

19. A method of manufacturing a rib for an aircraft wing, wherein the rib comprises a pair of opposing outer rib skins, each outer rib skin extending from an upper edge connectable to an upper outer wing skin of the aircraft wing to a lower edge connectable to a lower outer wing skin of the aircraft wing, one of the outer rib skins spaced apart in a span-wise axis of the wing from the other of the outer rib skins in use so as to define an internal space there-between that separates the outer rib skins in the span-wise axis such that the outer rib skins are nonoverlapping along the span-wise axis, said method comprising the steps of:

(A) extruding a plurality of rib sub-sections, each rib sub-section comprising two opposing outer rib skin portions, one of the outer rib skin portions of each rib sub-section spaced apart in a span-wise axis of the wing from the other of the outer rib skins portions of that rib sub-section in use so as to define an internal space there-between that separates the outer rib skin skin portions along the span-wise axis such that the outer rib skin skin portions are nonoverlapping along the span-wise axis, and a plurality of reinforcement portions extending across the space and connecting the two opposing outer rib skin portions; and
(B) connecting the plurality of the rib sub-sections together to form the rib;
wherein at least one of the reinforcement portions has a stepped or tapered cross-section such that a portion of the reinforcement portion between the opposing outer rib skins has a smaller cross-section than portions adjacent to the opposing outer rib skins.

20. The method of claim 19, wherein the outer rib skin portions are provided with a matching portion arranged in use to abut with a corresponding matching portion of an adjacent rib sub-section.

* * * * *